(12) United States Patent
Fu et al.

(10) Patent No.: US 6,273,378 B1
(45) Date of Patent: Aug. 14, 2001

(54) VEHICLE AUXILIARY-LAMP MOUNTING ASSEMBLY

(76) Inventors: Sam Fu; Calvin S. Wang, both of 14317 E. Don Julian Rd., Industry, CA (US) 91746

( * ) Notice: Subject to any disclaimer, the term of this patent is extended or adjusted under 35 U.S.C. 154(b) by 0 days.

(21) Appl. No.: 09/338,075

(22) Filed: Jun. 23, 1999

(51) Int. Cl.[7] .............................. A47B 96/00; A47K 1/00; A47K 5/00; E04G 5/06; F16L 3/08
(52) U.S. Cl. ........................ 248/222.11; 248/221.11; 248/220.21; 248/220.22; 248/309.1; 248/314; 248/346.03; 248/346.06; 248/187.1; 362/488; 362/490
(58) Field of Search ................... 248/222.11, 221.11, 248/220.21, 220.22, 309.1, 310, 316.8, 314, 346.03, 346.06, 176.1, 178.1, 187.1, 488; 296/37.7; 312/333, 334.46; 362/488, 490, 382, 190, 191

(56) References Cited

U.S. PATENT DOCUMENTS

| | | | |
|---|---|---|---|
| 4,094,485 | * | 6/1978 | O'Callaghan ................ 248/309 X |
| 4,241,870 | * | 12/1980 | Marcus ............................. 296/37.7 |
| 4,561,544 | * | 12/1985 | Reeve ................................ 206/540 |
| 4,819,134 | * | 4/1989 | Rossi ................................... 362/61 |
| 4,979,909 | * | 12/1990 | Andrews ............................ 439/352 |
| 5,077,643 | * | 12/1991 | Leach ................................. 362/183 |
| 5,262,923 | * | 11/1993 | Batta et al. ........................ 361/685 |
| 5,541,579 | * | 7/1996 | Kiernan ............................. 340/573 |
| 5,595,501 | * | 1/1997 | Ho ...................................... 439/377 |
| 5,599,086 | * | 2/1997 | Dutta ................................... 362/74 |
| 5,738,324 | * | 4/1998 | Van Hout et al. ........... 248/309.1 X |
| 5,761,030 | * | 6/1998 | Roscoe ............................... 361/684 |
| 5,947,435 | * | 9/1999 | Small ............................... 248/309.1 |

\* cited by examiner

Primary Examiner—Leslie A. Braun
Assistant Examiner—A. Joseph Wujciak
(74) Attorney, Agent, or Firm—Albert O. Cota (57) ABSTRACT

A vehicle auxiliary-lamp mounting assembly (10) consisting of a lamp-housing bracket (12) which has attached a resilient latch insert (50), and a lamp-housing mounting bracket (100) which incorporates a latch receptor (116). The lamp housing bracket (12) is adjustably attached to the sides of a vehicle auxiliary lamp (200), and the lamp-housing mounting bracket (100) is attached to a vehicle structure. When the resilient latch insert (50) is inserted into the latch receptor (116) the vehicle auxiliary lamp (200) is secured. Normally, a conventional vehicle lamp mounting assembly cannot be easily attached adjacent to a corner structure because there is insufficient space to insert and tighten a bolt or nut into the lamp mounting assembly. By utilizing the vehicle auxiliary-lamp mounting assembly (10) the problem of attaching and detaching a lamp assembly adjacent to a corner structure is solved.

9 Claims, 5 Drawing Sheets fig. 1 fig. 2 fig. 3 fig. 4 fig. 5 fig. 6 fig. 7 fig. 8 fig. 9

VEHICLE AUXILIARY-LAMP MOUNTING ASSEMBLY

TECHNICAL FIELD

The invention pertains to the general field of vehicle illumination system and more particularly to an after-market auxiliary lamp assembly that is easily attached to a corner of a vehicle structure.

BACKGROUND ART

In recent years the inclusion of auxiliary lamps, which are often referred to as fog lights/lamps, on motor vehicles has become a standard practice. Most new vehicles provide auxiliary lamps as an element of the vehicle's normal illumination system. The reason for this is that auxiliary lamps are able to provide often needed additional light, which a vehicle's low and/or high beam headlights are incapable of. Using auxiliary lamps is therefore easy and convenient for those individuals fortunate enough to own a later model vehicle with built-in auxiliary lamps.

For older-model vehicles, though, which did not provide auxiliary lamps, there are after-market kits available for the attachment of auxiliary lamps. These kits usually include two lamps and brackets with mounting hardware. The designers of these kits have obviously attempted to make the attachment of the lamps relatively easy, otherwise it would be too difficult to put the lamps on a vehicle and the kits would not sell. Usually the kits are well-made and the attachment of the auxiliary lamps can be accomplished with a minimal amount of labor.

One obstacle that the kit designers have found difficult to overcome, though, is how to attach auxiliary lamps onto or adjacent to a corner structure. Conventional auxiliary lamps cannot be attached to a corner because there is not enough space to insert and tighten a bolt/nut, screw or similar hardware that is located on the side of a conventional auxiliary lamp bracket. This is unfortunate in that for many vehicles there is no other suitable location for attaching auxiliary lamps. If there were a device or apparatus available that would facilitate the attachment of auxiliary lamps to a corner structure it would be beneficial to many vehicle owners.

DISCLOSURE OF THE INVENTION

The vehicle auxiliary-lamp mounting assembly in its most basic design consists of the following major elements:

a) a lamp-housing bracket having means for being adjustably attached to the right and left vertical sides of the lamp housing, b) a resilient latch insert, attached by an attachment means, to the lamp housing bracket, and c) a lamp-housing mounting bracket which incorporates a latch receptor that is dimensioned to receive, secure and release the resilient latch insert, and a means for being adjustably attached to a vehicle structure.

To illustrate the utility of the invention, it should be assumed that an auxiliary lamp is to be attached to and detached from a corner of a vehicle structure. The structure consists of an upper surface and a side surface, such as found on a typical vehicle grill opening. Normally, a conventional auxiliary lamp cannot be attached adjacent to a corner because there is insufficient space to insert and tighten a bolt or nut that is located on the side of the conventional auxiliary lamp bracket.

The problem of attaching or removing an auxiliary lamp adjacent a vehicle corner is eliminated by utilizing the vehicle auxiliary lamp assembly assembly.

To implement the invention, the following steps are performed:

1. Attach the lamp housing bracket to the auxiliary lamp housing with the resilient latch insert projecting form the rear of the auxiliary lamp housing.
2. Position the lamp-housing mounting bracket on the upper surface of the vehicle structure so that when the latch insert is inserted into the latch receptor, the outward side of the auxiliary lamp is adjacent to either the right or left side surface of the vehicle structure.
3. Permanently attach the mounting bracket to the upper surface of the vehicle structure by means of screws.
4. Attach the auxiliary lamp by inserting the resilient latch insert into the latch receptor.

The means for releasing the resilient latch insert on the lamp housing bracket from the latch receptor on the lamp-housing mounting bracket is disclosed in two designs.

In the first design, the resilient latch insert includes a lowered resilient member from where extends outward a lamp-housing bracket release tab. To extract the lamp-housing bracket, the release tab is manually depressed and held in the depressed position while the lamp-housing bracket is manually extracted.

In the second design, the resilient latch insert includes a lowered resilient member and an upward extending release key tab having a substantially centered key slot. The key slot is accessed by a bracket release key having a front end that is keyed to fit into the key slot, and a rear end having a finger grasping tab. To extract the lamp housing bracket in this second design, the key is inserted into the key slot until the front end of the key interfaces with the upper surface of the lowered resilient member. The finger grasping tab is then move upward to pivot the key and cause the front end of the key to depress the lowered resilient member. While the resilient member is depressed the lamp housing bracket is extracted.

In view of the above disclosure, it is the primary object of the invention to provide an auxiliary-lamp mounting assembly which allows an auxiliary lamp to be easily and quickly attached adjacent to a corner or a vehicle structure.

In addition to the primary object of the invention it is also an object of the invention to provide a lamp mounting assembly that:

can be dimensioned to accommodate various sizes and shapes of light assemblies, can be designed with minor modifications to attach other vehicle implements to a normally inaccessible vehicle corner, is maintenance free, and is cost effective from both a manufacturers and consumers point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment, which is comprised of two design configurations for a vehicle auxiliary-lamp mounting assembly. Both design confirmations provide a means by which an auxiliary lamp may be attached to a vehicle. The specific utility of the invention is to allow an auxiliary lamp to be mounted onto a corner structure. Conventional auxiliary lamp assemblies do not provide any means for accomplishing this type of mounting. Additionally the configuration of both designs allows the vehicle auxiliary-lamp mounting assembly to be attached adjacent to a left or right corner intersection bordered by a horizontal section and a vertical section.

The first design of the preferred embodiment for the vehicle auxiliary lamp mounting assembly 10, hereinafter "assembly 10", as shown in FIGS. 1–7, is comprised of the following major elements; a lamp housing bracket 12, an elongated vertical slot 42, a resilient latch insert 50, a resilient horizontal member 72, and a lamp-housing mounting bracket 100.

Figure 1:
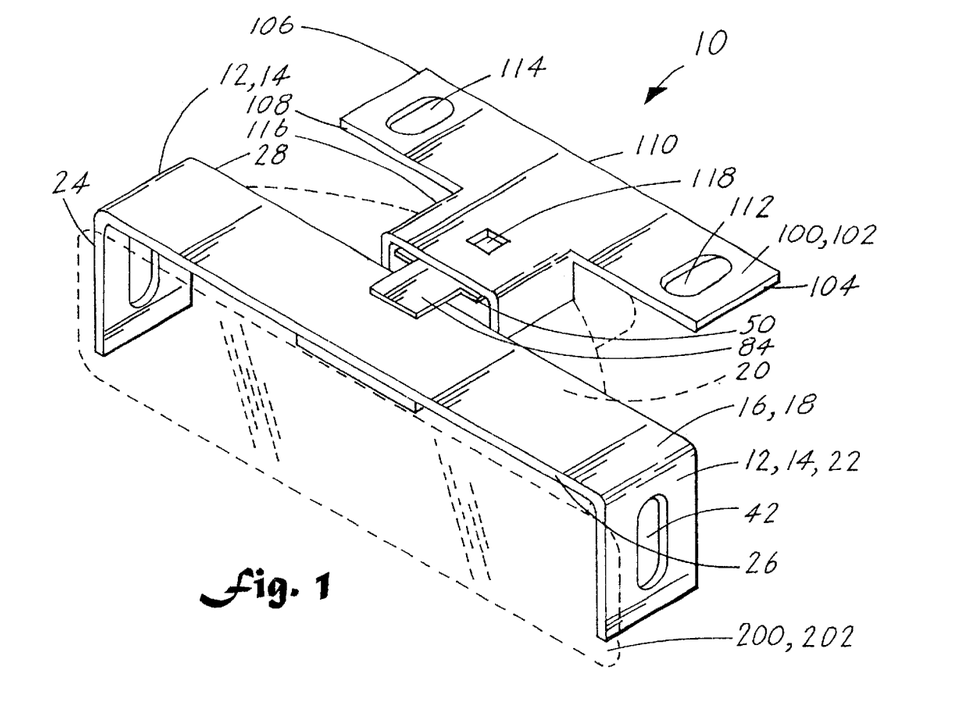
FIG. 1 is a perspective view of the vehicle-lamp mounting assembly attached to a vehicle auxiliary lamp.

As shown in FIG. 1, the assembly 10 is designed to function in combination with a vehicle auxiliary lamp 200. The lamp 200, which is shown in FIGS. 1–5 is comprised of a lamp housing 202 which includes an upper surface 204, a lower surface 206, a front light-emitting section 208, a rear section 210 having an electrical connector 212 attached to a vehicle's power source 214, a right vertical side 216 and a left vertical side 218, with each side 216,218 having a threaded bore 220.

Figure 7:
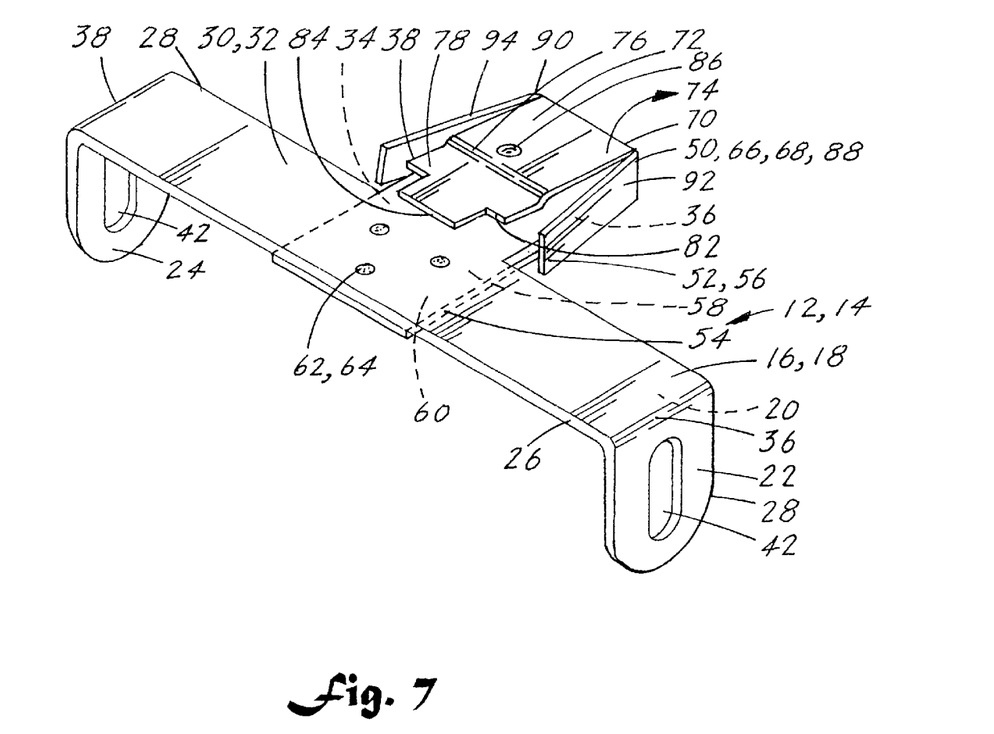
FIG. 7 is a perspective view of a lamp housing bracket attached to a resilient latch insert as disclosed for the first design of the preferred embodiment.

In order to secure the lamp housing 202 in place, the lamp housing bracket 12 is utilized. The bracket 12, as shown in FIGS. 1, 5–7, is configured as an inverted U-section 14 having a horizontal member 16 with an upper surface 18 and a lower surface 20, a right vertical member 22, and a left vertical member 24, with all the members 16,22,24 having an outer edge 26 and an inner edge 28. From the substantial center of the inner edge 28 of the horizontal member 16 extends inward an integral tab 30, as shown in FIG. 7, having an upper surface 32, a lower surface 34, a right edge 36 and a left edge 28. As also shown in FIG. 7, the elongated vertical slot 42 is located on each respective right and left vertical member 22,24, and is dimensioned to be juxtaposed and aligned respectively with the threaded bores 220 that are located on the right and left vertical sides 216,218 of the lamp housing 202. When a bolt 44 is inserted through the slots 42 and threaded into the threaded bores 220, the lamp housing bracket 12 can be vertically and angularly aligned and secured to the lamp housing 200.

The resilient latch insert 50, which is made from a thin resilient metal, is shown in FIGS. 1 and 7 and is comprised of a lower member 52 having an outer section 54, an inner section 56, an upper surface 58 and a lower surface 60. The upper surface 58 of the outer section 54 is centrally attached, by an attachment means 62, to the lower surface 20 of the horizontal member 16. Preferably, the attachment means 62 is comprised of a spot-welding process, as shown in FIG. 7. The inner section 56 has a terminus 66 which consists of an upward-extending vertical member 68 having an upper edge 70 from where extends outward the resilient horizontal member 72, as also shown in FIG. 7. The resilient horizontal member 72 is biased 74 in an upward direction and has a substantially-centered, downward-extending, lateral indentation 76, which continues outward with a lower 50 resilient member 78 that terminates with an outer edge 82. Extending outward from the outer edge 82 is a lamp housing bracket release tab 84, as shown in FIGS. 1, 3, 5 and 7. Adjacent the inner side of the lateral indentation 76 is centrally located a locking protrusion 86. The upward-extending vertical member 68 of the terminus 66 also has a right vertical edge 88 and a left vertical edge 90. As shown in FIG. 7, from each edge 88,90 extends respectively a right resilient section 92 and a left resilient section 94, both of which are biased 74 in an outward direction.

Figure 9:
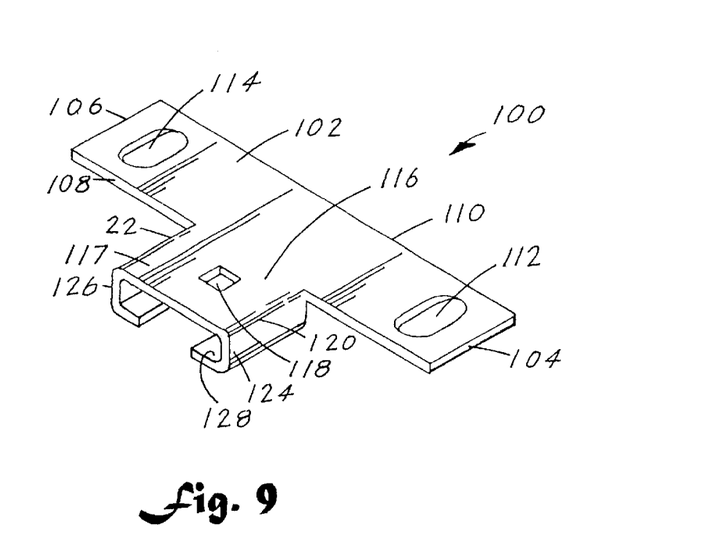
FIG. 9 is a perspective view of a lamp-housing mounting bracket as used for both the first and second design of the lamp housing bracket.

The lamp-housing mounting bracket 100, as shown in FIGS. 1–6 and 9, is configured as a T-section having a longitudinal section 102 with a right edge 104, a left edge 106, and outer edge 10-8 and an inner edge 110. Located adjacent each respective right and left edges 104,106 is a lateral right vehicle mounting slot 112 and a lateral left vehicle mounting slot 114 as shown in FIGS. 1, 3, 4 and 9. From the center of the outer edge 108 extends a lateral latch receptor 116, which is comprised of an upper section 117 having a lock slot 118, a right edge 120 and a left edge 122. From the right and left edges 120,122 respectively extends downward a right vertical section 124 and a left vertical section 126, wherein both sections terminate with an inward-extending horizontal section 128 as shown in FIG. 9.

In order to attach the lamp housing mounting bracket 100 to an upper surface or a lower surface of a vehicle structure, screws are inserted into the right and left mounting slots 112,114, with the latch receptor 116 facing outward. The resilient latch insert 50 may then be inserted into the latch receptor 116. The assembly 10 is secured to the vehicle when the locking protrusion 86 that is located on the resilient latch insert 30 projects through the central lock slot 118 which is located on the lamp-housing mounting bracket 100.

To release the lamp housing bracket 12, the release tab 84 is depressed and held in the depressed position while the lamp housing bracket is extracted.

The second design of the assembly 10, as shown in FIGS. 1–6 and 8, is comprised of the following major elements: the lamp housing bracket 12, the elongated vertical slot 42, a resilient latch insert 130, and a bracket release key 180. As in the first design, the second design of the assembly 10 is designed to function in combination with a vehicle auxiliary lamp 200.

The lamp 200, which is shown in FIGS. 1–5, is comprised of a lamp housing 202 which includes an upper surface 204, a lower surface 206, a front light-emitting section 208, a rear section 210 having an electrical connector 212 attached to a vehicle's power source 214, a right vertical side 216 and a left vertical side 218, with each side 216,218 having a threaded bore 220.

Figure 8:
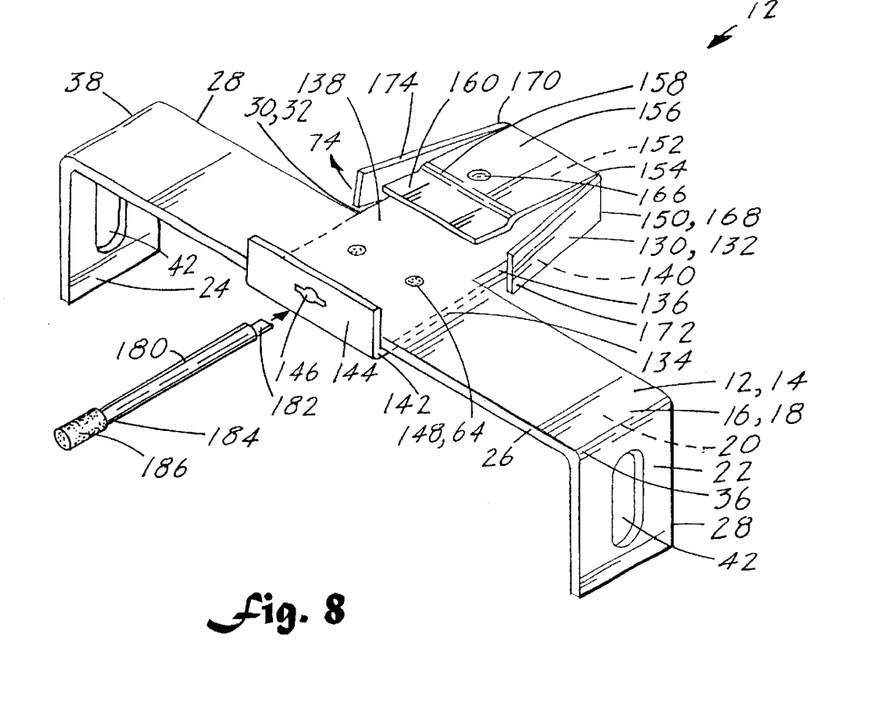
FIG. 8 is a perspective view of a lamp housing bracket attached to a resilient latch insert as disclosed for the second design of the preferred embodiment. This figure also shows a typical bracket release key.

In order to secure the lamp housing 202 of the second design in place, the lamp housing bracket 12 is utilized. As described in the specifications for the first design of the assembly 10, the bracket 12, as shown in FIGS. 1 and 8, is configured as an inverted U-section 14 having a horizontal member 16 with an upper surface 18 and a lower surface 20, a right vertical member 22, and a left vertical member 24, with all the members 16,22,24 having an outer edge 26 and an inner edge 28. From the substantial center of the inner edge 28 of the horizontal member 10 extends inward an integral tab 30, as shown in FIG. 7, having an upper surface 32, a lower surface 34, a right edge 36, and a left edge 38. As also shown in FIG. 7, the elongated vertical slot 42 is located on each respective right and left vertical member 22,24, and is dimensioned to be juxtaposed and aligned respectively with the threaded bores 220 that are located on the right and left vertical sides 216,218 of the lamp housing 202. When a bolt 44 is inserted through the slots 42 and threaded into the threaded bores 220, the lamp housing bracket 12 can be vertically and angularly aligned and secured to the lamp housing 200.

The resilient latch insert 130, as shown in FIG. 8, is preferably made from a thin, resilient metal and is comprised of a lower member 132 having an outer member 134, an inner section 136, an upper section 138 and a lower surface 140. As shown in FIG. 8, the outer section 134 terminates with an outer edge 142 from where extends upward a release key tab 144 having a substantially centered key slot 146. The upper surface 138 of the outer section 134 is centrally attached, by an attachment means 148, to the lower surface 20 of the horizontal member 16 with the release key tab 144 projecting upward along the outer edge 26 of the lamp housing bracket 12 as also shown in FIG. 8. The means for attaching the upper surface 20 of the horizontal member 16 is comprised of a spot-welding process 64. As further shown in FIG. 8, the inner section 136 has a terminus 150 consisting of an upward-extending vertical member 152. The vertical member 152 has an upper edge 154 from where extends outward a resilient horizontal member 156 that is biased 74 in an upward direction. A substantially-centered, downward-extending lateral indentation 158, as also shown in FIG. 8, continues with a lowered resilient member 160 that terminates with an outer edge 164. Located adjacent the inner side of the lateral indentation 158 is centrally positioned a locking protrusion 146. Additionally, the upward-extending vertical member 152 of the terminus 150 also has a right vertical edge 168 and a left vertical edge 170. From each end 168,170 extends respectively a right resilient section 172 and a left resilient section 174, both of which are biased 74 in an outward direction.

Figure 2:
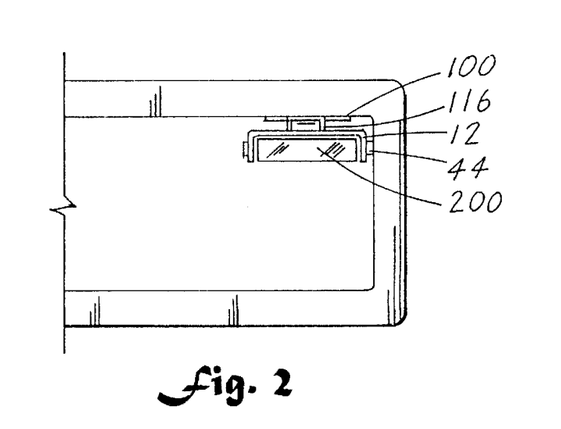
FIG. 2 is a front elevational view showing the vehicle auxiliary lamp attached adjacent to a corner that is bordered by a substantially horizontal and vertical section.
Figure 3:
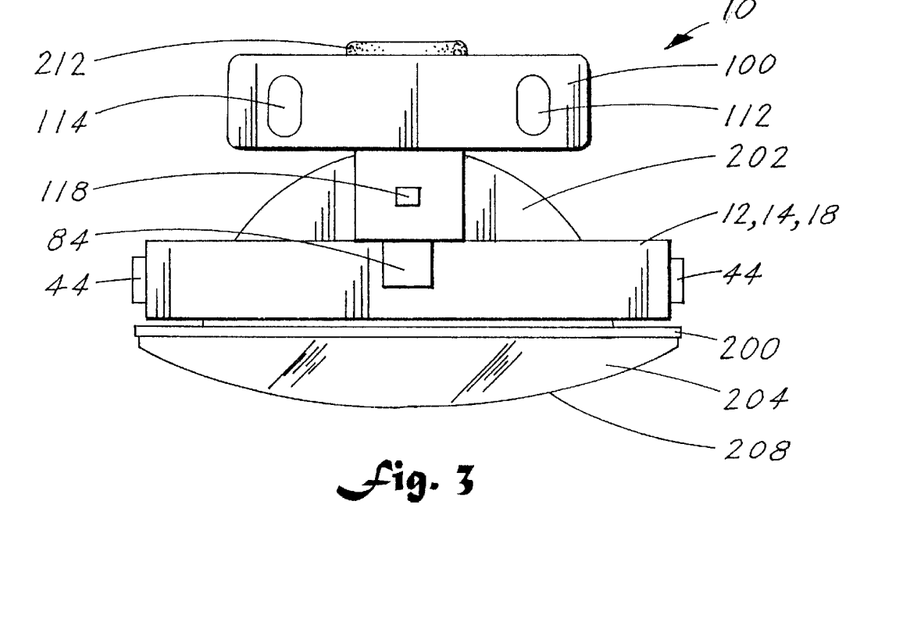
FIG. 3 is an upper plan view of the vehicle auxiliary-lamp mounting assembly attached to a vehicle lamp.
Figure 4:
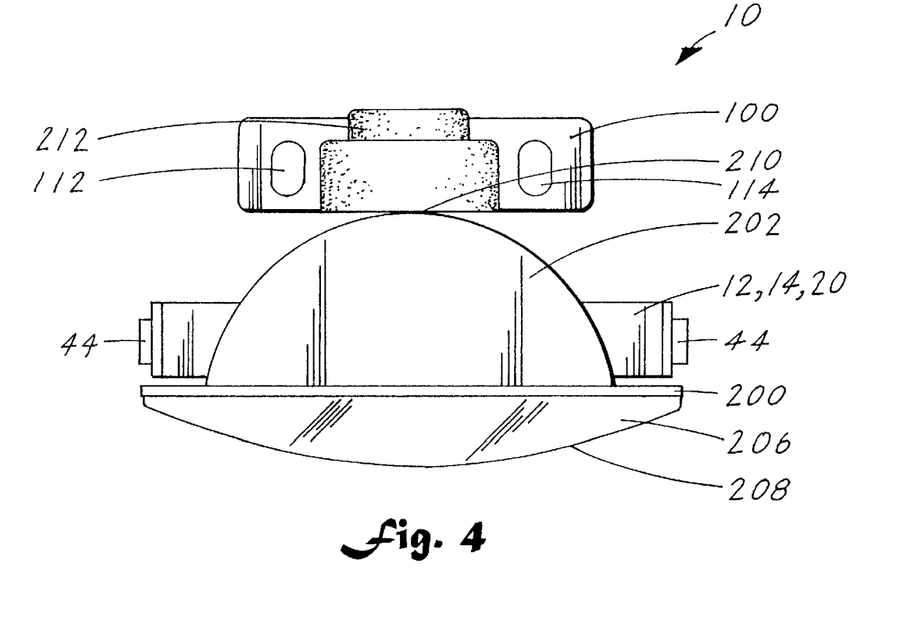
FIG. 4 is a lower plan view of the vehicle auxiliary-lamp mounting assembly attached to a vehicle lamp.
Figure 5:
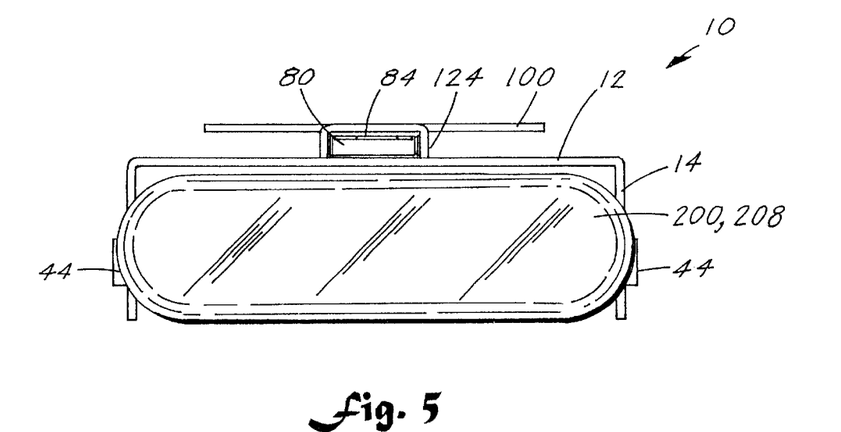
FIG. 5 is a front plan view of the vehicle auxiliary-lamp mounting assembly attached to a vehicle lamp.
Figure 6:
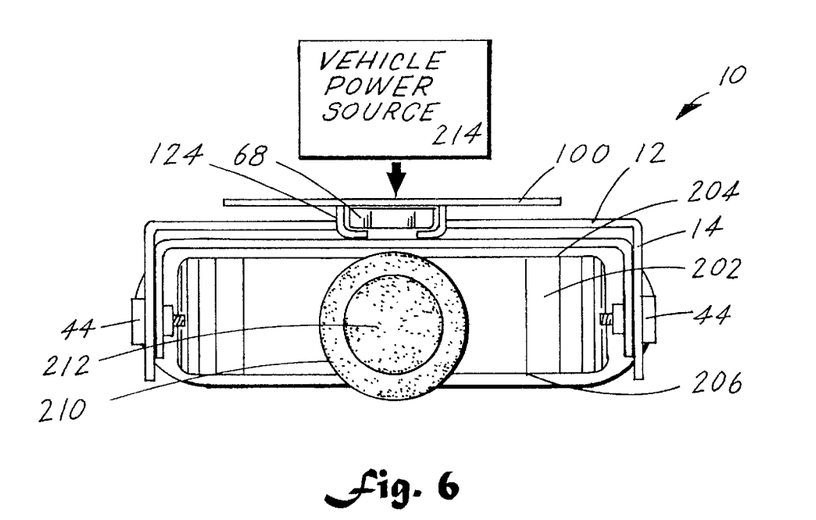
FIG. 6 is a rear plan view of the vehicle auxiliary-lamp mounting assembly attached to a vehicle lamp.

The lamp-housing mounting bracket 100, as shown in FIGS. 1–6 and 9, is configured as a T-section having a longitudinal section 102 with a right edge 104, a left edge 106, an outer edge 108 and an inner edge 110. Located adjacent the right and left edges 104,106 is respectively a lateral right vehicle mounting slot 112 and a lateral left vehicle mounting slot 114, as shown in FIGS. 1, 3 and 4.

From the center of the outer edge 108 extends a lateral latch receptor 116, as shown in FIGS. 2 and 9. The latch receptor 116 is comprised of an upper section 117 having a lock slot 118, a right edge 120 and a left edge 122. From the right and left edges 120,122 respectively extends downward a right vertical section 124 an a left vertical section 126, wherein both sections 124,126 terminate with an inward-extending horizontal section 128, as also shown in FIG. 9.

In order to attach the lamp-housing mounting bracket 100 to an upper or lower surface of a vehicle structure, screws are inserted into the right and left mounting slots 112,114, with the latch receptor 116 facing outward. The resilient latch insert 130 can then be inserted into the latch receptor 116. The assembly 10 is secured to the vehicle once the locking protrusion 166, which is located on the latch insert 130, projects through the central lock slot 118, which is located on the lamp-housing mounting bracket 100.

In order to facilitate the removal of the assembly 10 once it has been secured, the bracket release key 180 is utilized. The bracket release key 180, as shown in FIG. 8, has a front end 182 which is keyed to fit into the key slot 146 on the release key tab 144, and a rear end 184 having a finger grasping tab 186. To extract the lamp-housing bracket 12, the key 180 is inserted into the key slot 146 until the front end 182 of the key 180 interfaces with the upper surface of the lowered resilient member 160 of the resilient horizontal member 156. The finger grasping tab 186 is then moved upward to pivot the key 180 and cause the front end 182 of the key 180 to depress the lowered resilient member 160, at which time the lamp housing bracket 12 may be extracted.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

What is claimed is:

1. A vehicle auxiliary-lamp mounting assembly adapted to be used in combination with a vehicle auxiliary lamp located within a lamp housing having an upper surface, a lower surface, a front light-emitting section, a rear section having an electrical connector attached to a vehicle's power source, a right vertical side and a left vertical side each having a threaded bore, said vehicle auxiliary lamp mounting assembly comprising:

a) a lamp housing bracket configured as an inverted U-section having a horizontal member with an upper surface and a lower surface, a right vertical member and a left vertical member, wherein all members have a outer edge and an inner edge, wherein from the substantial center of the inner edge of the horizontal member extends inward an integral tab having an upper surface, a lower surface, a right edge and a left edge, wherein the right and left vertical members each having an elongated vertical slot dimensioned to be juxtaposed and aligned respectively with the threaded bores on the right and left vertical sides of said lamp housing, wherein when a bolt is inserted through the slots and threaded into the threaded bores said lamp housing bracket can be vertically and angularly aligned and secured to said lamp housing, b) a resilient latch insert attached, by an attachment means, to said lamp housing bracket, and c) a lamp-housing mounting bracket incorporating a latch receptor having means for receiving, securing and releasing said resilient latch insert, and means for adjustably attached to a vehicle structure, wherein said vehicle auxiliary-lamp mounting assembly allows a vehicle auxiliary-lamp to be mounted adjacent to a corner of the vehicle structure.

2. The assembly as specified in claim 1 wherein said means for attaching said resilient latch insert to said lamp housing bracket comprises, said resilient latch insert having a lower member with an outer section, an inner section, and upper surface and a lower surface, wherein the upper surface of the outer section is centrally attached, by an attachment means, to the lower surface of the horizontal member, wherein the inner section has a terminus consisting of an upward-extending vertical member having an upper edge from where extends outward a resilient horizontal member that is biased in an upward direction and having a substantially-centered, downward-extending, lateral indentation which continues outward with a lowered resilient member that terminates with an outer edge from where extends outward a lamp housing bracket release tab, wherein adjacent the inward side of the lateral indentation is centrally located a locking protrusion, wherein the upward-extending vertical member of the terminus also has a right vertical edge and a left vertical edge wherein from each edge extends respectively a right resilient section and a left resilient section both biased in an outward direction.

3. The assembly as specified in claim 2 wherein said means for releasing said resilient latch insert from said lateral latch receptor is accomplished by depressing and holding the release tab in the depressed position while the lamp housing bracket is extracted from the lateral latch receptor.

4. The assembly as specified in claim 3 wherein said means for releasing said resilient latch insert from said lateral latch receptor is accomplished by a bracket release key having a front end keyed to fit into key slot on said release key tab and a rear end having a finger grasping tab, wherein to extract said lamp housing bracket, said bracket release key is inserted into the key slot until the front end of said key interfaces with the upper surface of the lowered resilient member of the resilient horizontal member, the finger grasping tab is then moved upward to pivot said key and cause the front end of said key to depress the lowered resilient member at which time the lamp housing bracket is extracted.

5. The assembly as specified in claim 1 wherein said means for adjustably attaching said lamp-housing mounting bracket to said vehicle structure comprises: said lamp-housing mounting bracket configured as a T-section having a longitudinal section with a right edge, a left edge, an outer edge and an inner edge, wherein adjacent the right and left edges is respectively a lateral right vehicle mounting slot and a lateral left vehicle mounting slot, wherein into each slot is inserted a screw that is screwed into said vehicle structure, wherein from the center of the outer edge extends a lateral latch receptor comprising an upper section having a lock slot, a right edge and a left edges, wherein from the right and left edges respectively extends downward a right vertical section and a left vertical section, wherein both sections terminate with an inward extending horizontal section.

6. The assembly as specified in claim 5 wherein said means for removably securing said resilient latch insert to the lateral latch receptor is accomplished when said resilient latch insert is inserted into the lateral latch receptor which allows the locking protrusion on said resilient latch insert to project through the lock slot on the lateral lock receptor.

7. The assembly as specified in claim 1 wherein said means for attaching said resilient latch insert to said lamp housing bracket comprises said resilient latch insert having a lower member with an outer section, an inner section, and upper surface and a lower surface, wherein the upper surface of the outer section is centrally attached, by an attachment means, to the lower surface of the horizontal member, wherein the inner section has a terminus consisting of an upward-extending vertical member having an upper edge from where extends outward a resilient horizontal member that is biased in an upward direction and having a substantially-centered, downward-extending, lateral indentation which continues outward with a lowered resilient member that terminates with an outer edge from where extends outward a lamp housing bracket release tab, wherein adjacent the inward side of the lateral indentation is centrally located a locking protrusion, wherein the upward-extending vertical member of the terminus also has a right vertical edge and a left vertical edge wherein from each edge extends respectively a right resilient section and a left resilient section both biased in an outward direction.

8. A vehicle auxiliary lamp mounting assembly which functions in combination with vehicle auxiliary lamp comprising a lamp housing which includes an upper surface, a lower surface, a front light-emitting section, a rear section having an electrical connector attached to a vehicle power source, a right vertical side and a left vertical side each having a threaded bore, said vehicle auxiliary-lamp mounting assembly comprising:

a) a lamp housing bracket configured as an inverted U-section having a horizontal member with an upper surface and a lower surface, a right vertical member and a left vertical member, wherein all members have a outer edge and an inner edge, wherein from the substantial center of the inner edge of the horizontal member extends inward an integral tab having an upper surface, a lower surface, a right edge and a left edge, wherein the right and left vertical members each having an elongated vertical slot dimensioned to be juxtaposed and aligned respectively with the threaded bores on the right and left vertical sides of said lamp housing, wherein when a bolt is inserted through the slots and threaded into the threaded bores said lamp housing bracket can be vertically and angularly aligned and secured to said lamp housing, b) a resilient latch insert having a lower member with an outer section, an inner section, an upper surface and a lower surface, wherein the upper surface of the outer section is centrally attached, by an attachment means, to the lower surface of the horizontal member, wherein the inner section has a terminus consisting of an upward-extending vertical member having an upper edge from where extends outward a resilient horizontal member that is biased in an upward direction and having a substantially-centered, downward-extending, lateral indentation which continues outward with a lowered resilient member that terminates with an outer edge from where extends outward a lamp housing bracket release tab, wherein adjacent the inner side of the lateral indentation is centrally located a locking protrusion, wherein the upward-extending vertical member of the terminus also has a right vertical edge and a left vertical edge wherein from each edge extends respectively a right resilient section and a left resilient section both biased in an outward direction, c) a lamp-housing mounting bracket configured as a T-section having a longitudinal section with a right edge, a left edge, an outer edge and an inner edge, wherein adjacent the right and left edges is respectively a lateral right vehicle mounting slot and a lateral left vehicle mounting slot, wherein from the center of the outer edge extends a lateral latch receptor comprising an upper section having a lock slot, a right edge and a left edge, wherein from the right and left edges respectively extends downward a right vertical section and a left vertical section, wherein both sections terminate with an inward-extending horizontal section, wherein when said lamp-housing mounting bracket is attached to an upper surface or a lower surface of a vehicle structure, by inserting screws into the right and left mounting slots, with the latch receptor facing outward, said resilient latch insert can be inserted into the latch protrusion on said resilient latch insert projects through the central lock slot on said lamp-housing mounting bracket, said vehicle auxiliary-lamp mounting assembly is secured to the vehicle, wherein to release said lamp housing bracket the release tab is depressed and held in the depressed position while the lamp housing bracket is extracted.

9. A vehicle auxiliary lamp mounting assembly which functions in combination with vehicle auxiliary lamp comprising a lamp housing which includes an upper surface, a lower surface, a front light-emitting section, a rear section having an electrical connector attached to a vehicle power source, and a right vertical side and a left vertical side each having a threaded bore, said vehicle auxiliary-lamp mounting assembly comprising:

a) a lamp housing bracket configured as an inverted U-section having a horizontal member with an upper surface and a lower surface, a right vertical member and a left vertical member, wherein all members have a outer edge and an inner edge, wherein from the substantial center of the inner edge of the horizontal member extends inward an integral tab having an upper surface, a lower surface, a right edge and a left edge, wherein the right and left vertical members each having an elongated vertical slot dimensioned to be juxtaposed and aligned respectively with the threaded bores on the right and left vertical sides of said lamp housing, wherein when a bolt is inserted through the slots and threaded into the threaded bores said lamp housing bracket can be vertically and angularly aligned and secured to said lamp housing, b) a resilient latch insert having a lower member with an outer section, an inner section, an upper surface and a lower surface, wherein the outer section terminates with an outer edge from where extends upward a release key tab having a substantially centered key slot, wherein the upper surface of the outer section is centrally attached, by an attachment means, to the lower surface of the horizontal member with the release key tab projecting upward along the outer upper edge of said lamp housing bracket, wherein the inner section has a terminus consisting of an upward-extending vertical member having an upper edge from where extends outward a resilient horizontal member that is biased in an upward direction and having a substantially centered, downward-extending, lateral indentation which continues with a lowered resilient member that terminates with an outer edge, wherein adjacent the inner side of the lateral indentation is centrally located a locking protrusion, wherein the upward-extending vertical member of the terminus also has a right vertical edge and a left vertical edge wherein from each edge extends respectively a right resilient section and a left resilient section both biased in an outward direction, c) a lamp-housing mounting bracket configured as a T-section having a longitudinal section with a right edge, a left edge, an outer edge and an inner edge, wherein adjacent the right and left edges is respectively a lateral right vehicle mounting slot and a lateral left vehicle mounting slot, wherein from the center of the outer edge extends a lateral latch receptor comprising an upper section having a lock slot, a right edge and a left edge, wherein from the right and left edges respectively extends downward a right vertical section and a left vertical section, wherein both sections terminate with an inward-extending horizontal section, wherein when said lamp-housing mounting bracket is attached to an upper surface or a lower surface of a vehicle structure, by inserting screws into the right and left mounting slots, with the latch receptor facing outward, said resilient latch insert can be inserted into the latch protrusion on said resilient latch insert projects through the central lock slot on said lamp-housing mounting bracket, said vehicle auxiliary-lamp mounting assembly is secured to the vehicle, and d) a bracket release having a front end keyed to fit into the key slot on said release key tab and a gear end having a finger grasping tab, wherein to extract said lamp housing bracket, said bracket release key is inserted into the key slot until the front end of said key interfaces with the upper surface of the lowered resilient member of the resilient horizontal member, the finger grasping tab is then moved upward to pivot said key and cause the front end of said key to depress the lowered resilient member at which time the lamp housing bracket is extracted.

* * * * *